Fig.2

Sept. 20, 1932.   L. L. MACK   1,878,283
POSTAGE METER
Filed Nov. 17, 1930   6 Sheets-Sheet 3

INVENTOR.
Arthur L. Mack

Sept. 20, 1932.  L. L. MACK  1,878,283
POSTAGE METER
Filed Nov. 17, 1930   6 Sheets-Sheet 4

INVENTOR.
Latham L. Mack

Sept. 20, 1932. L. L. MACK 1,878,283
POSTAGE METER
Filed Nov. 17, 1930 6 Sheets-Sheet 6

INVENTOR.

Patented Sept. 20, 1932

1,878,283

UNITED STATES PATENT OFFICE

LUTHER L. MACK, OF SOUTH PASADENA, CALIFORNIA, ASSIGNOR TO U. S. POSTAL METER CORPORATION, A CORPORATION OF DELAWARE

POSTAGE METER

Application filed November 17, 1930. Serial No. 496,195.

This invention relates to postage meters, and an object is to provide the combination of a mail feeding and forwarding mechanism and a meter detachably associated with the forwarding mechanism and removable at will whereby meters of different denominations may be selectively used in a machine.

Another object is to provide a postage meter including a housing with operating means thereon, a meter detachably secured to said housing and embodying printing and numbering mechanism arranged for operative connection with the operating means, and means for locking the meter in operative position.

A further object is to provide a locking mechanism which is effective for locking the printing means and the numbering means against operation when the meter is removed from the machine and effective also for unlocking the printing and numbering means when the meter is operatively positioned in the machine.

Reference is had in the consideration of this invention to my pending application for patent for postage meters filed Oct. 29, 1928, Ser. No. 315,617, and allowed Aug. 15, 1930, to which form of device the present improvements are adapted to be applied.

Other objects may appear as the description progresses.

The preferred form of invention is shown in the accompanying drawings in which.

It will be understood in the consideration of this invention that postage meters of the character shown and described herein are approved by the Post Office Department for use by persons, firms or corporations holding permits therefor, and each meter includes a printing member, which in the present instance is a rotatable cylinder having printing dies on the periphery thereof, and two separate but commonly operated registering units, all of which elements are enclosed in a suitable housing against unauthorized access and are operatively connected for registering the successive impressions made by the printing dies.

The registering mechanism includes an ascending registering unit which maintains a total of the postage impressions made by the printing cylinder, and a descending registering unit which subtracts successive impressions made from the number of impressions prepaid by the user. When the total number of prepaid impressions has been used the descending register will read "0", and means is provided in the meter for locking this unit against further operation until another set of impressions is paid for and the mechanism is reset by the postmaster or authorized officials.

The descending register is accessible only to authorized officials for setting, and to this end the meter housing is provided with a lock, the key to which is retained by the postal authorities, and said lock is usually protected by an escutcheon which is sealed over the keyhole so as to insure the integrity of the mechanism against tampering by unauthorized parties or with intention to defraud.

My present invention relates solely to the printing and registering mechanism, the inter-connection of said elements, and the detachable association thereof with the operating mechanism which is shown in my said pending application for patent.

Briefly described, however, the assembled machine, of which the meter is a part, includes a main housing 1 on which a meter 2 is detachably mounted and serves as a support for a rotatable printing cylinder 3. A suitable inking mechanism 4 is provided for supplying a film of ink to the printing cylinder 3 and an impression roller 5 is yieldably mounted adjacent the printing cylinder 3 for holding the matter to be printed firmly in contact with the printing die.

Figure 1:
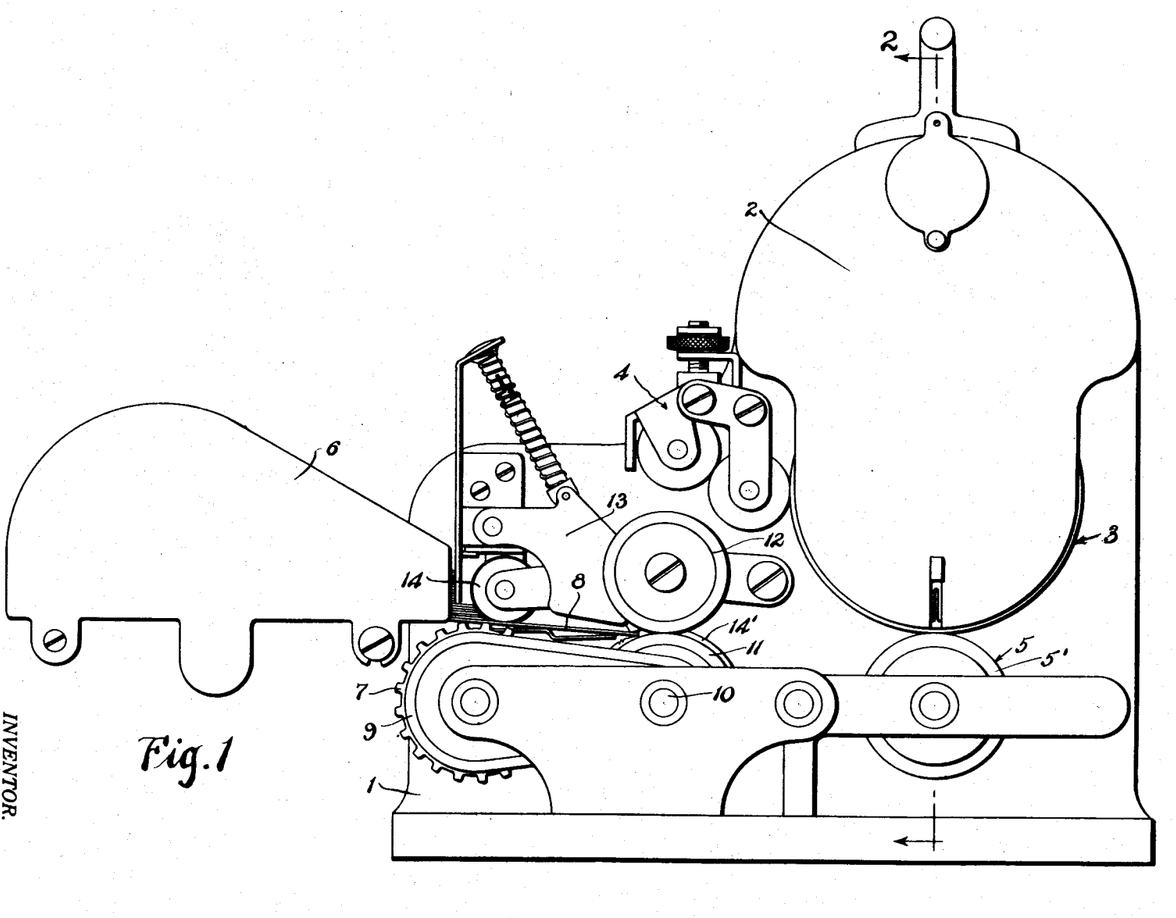
Fig. 1 is a front elevation of a complete postage meter embodying my improvements.

The mail matter is deposited in a feed hopper 6 as shown in Fig. 1, with the pieces of matter flatwise on the bottom of the hopper. Preferably one or more feed rollers, as at 7, is provided on the housing 1 adjacent the inner end of the feed hopper 6 for advancing the lowermost letters or pieces of mail matter 8 successively to the printing cylinder 3. The rollers 7 are driven by means of a belt or belts 9 operated from a shaft 10, on which are one or more forwarding rollers 11 with frictional surfaces which are coupled with yieldably mounted idler rollers, as at 12, between which the letters 8 are advanced to the grip of the cylinder 3 and impression roller 5 in succession.

A separator unit 13 is yieldably mounted above the feed rollers 7 and includes an independently yieldable frictional member 14 which engages the upper side of the lowermost letter of the stack and the inner ends of the upper letters to prevent the advance of but a single piece of matter to the printing cylinder at each operation. The shaft 10 also carries a non-frictional roller or rollers 14' which are adapted to cooperate with the feeding mechanism for accurately timing the letters 8 so that one of said letters will reach printing position for each revolution of the printing cylinder 3.

These features, however, are immaterial to the present invention, and are described in my said pending application for patent and will not be elaborated upon in this application.

The impression roller 3 and the forwarding rollers 11 are driven by gears, as at 15, enclosed in the rear of the housing 1 rearwardly of the front wall 16 of said housing and the impression roller 5 is connected with its gear 15 by means of a universal coupling 17. The gear 15 drives a cam 18 which is provided with a gear 19 on its face and an internal cam face 20. Said cam is engaged by a follower roller 21 carried on a horizontal arm of a yoke 22 which is pivoted at 23 rearwardly of the wall 16. Said yoke is bifurcated at its upper end 22' and the furcations thereof engage a washer 23 at the rear end of a sliding sleeve 24 which is journaled in a bearing 25 in the front wall of the housing.

Figure 2:
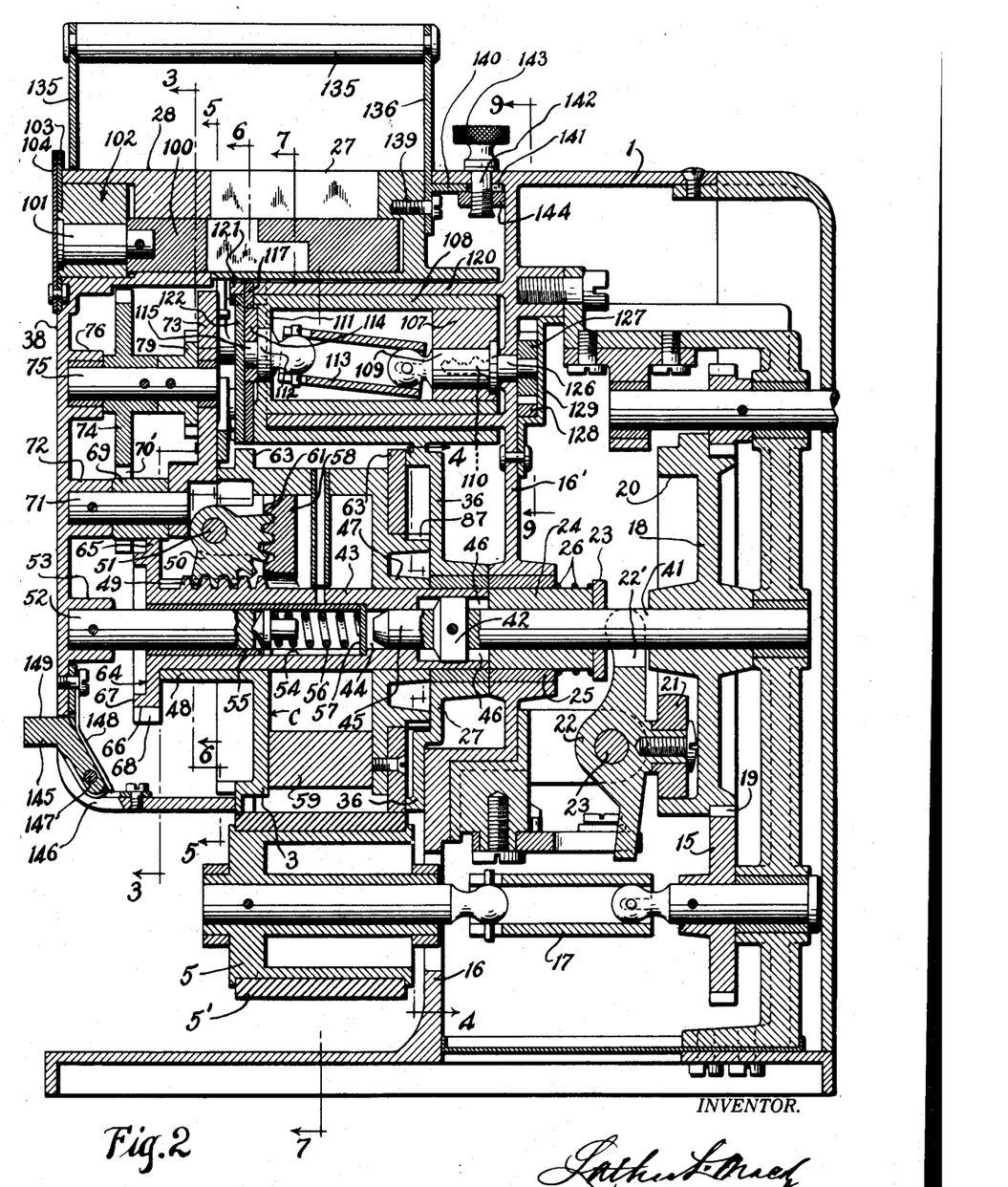
Fig. 2 is a transverse sectional elevation of the same on line 2—2 of Fig. 1, showing the operative connection of the metering mechanism with the machine proper.

A compression spring 26 is carried on the sleeve 24 between the rear end of bearing 25 and washer 23 for urging the sleeves and yoke rearwardly, as seen in Fig. 2. The washer 23 is suitably attached to the end of the sleeve 24. The meter housing is formed of two mating parts including a rear portion 27 and a front cover portion 28 which are attached together by means of a pair of screws 29, 29 having central bodies 30 seated in bores 31 of a cover, heads 32 seated in counter-bores 33, and reduced threaded stems 34 which are screwed into elongated bosses 35 which extend forwardly from the rear wall 36 of the member 27. The counter-bores 33 outwardly of the screw heads 32 are sealed by metal plugs 37 which are driven into the counter-bores tightly and finished flush with the front wall 38 of the cover so as to obscure and prevent unauthorized access to the screws 29.

Figure 8:
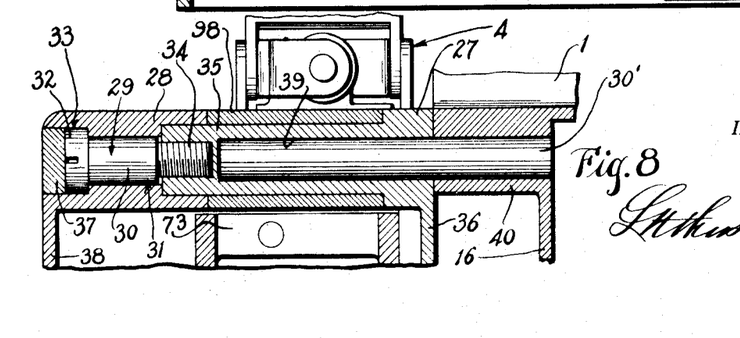
Fig. 8 is a fragmentary sectional plan of the meter housing on line 8—8 of Fig. 7 showing means for attaching and sealing the meter housing parts together against unauthorized access.

The bosses 35, 35 also serve to support the meter in operative position on the front wall 16 of the housing 1, said bosses being bored at 39 to receive elongated studs or pins 30' which are held in bosses 40 formed on the member 1, as shown in Fig. 8. It will be noted that the meter 2 is provided in its lower portion with a printing cylinder C and in its upper portion with an ascending register A and a descending register D.

The cylinder C is rotatably mounted in the meter housing coaxially with the main operating shaft 41, which carries a cam 18. Said shaft slidably receives and is coaxial with the sleeve 24 and is provided with a key 42 outwardly of bearing 25 which is arranged for detachable connection with the rear end of an elongated sleeve 43 forming a part of the printing cylinder C. The sleeve 43 has a bore 44 which receives the extended end portion 45 of shaft 41 and has diametrically opposite key seats 46 which receive the ends of the key 42, thereby operatively connecting the sleeve 43 for rotation with shaft 41 when the meter is in position on the machine. The sleeve 43 is slidably held in inner and outer hubs 47 and 48 of printing cylinder C and at a point near its outer end is provided with a series of gear teeth 49 forming a rack, which is adapted to mesh with a sector 50 carried on a pin 51 for oscillatably mounting the sector on cylinder C.

The outer end of sleeve 43 is rotatably supported on a trunnion 52 which is held in a bearing 53 on the front wall 38 of the meter and is counter-bored at 54 to receive a sleeve 55 within which is housed a compression spring 56. Said spring compresses between the inner end of trunnion 52 and an end 57 of sleeve 55 and serves to normally retract the sleeve 43 inwardly to the position shown in Fig. 2.

Figure 7:
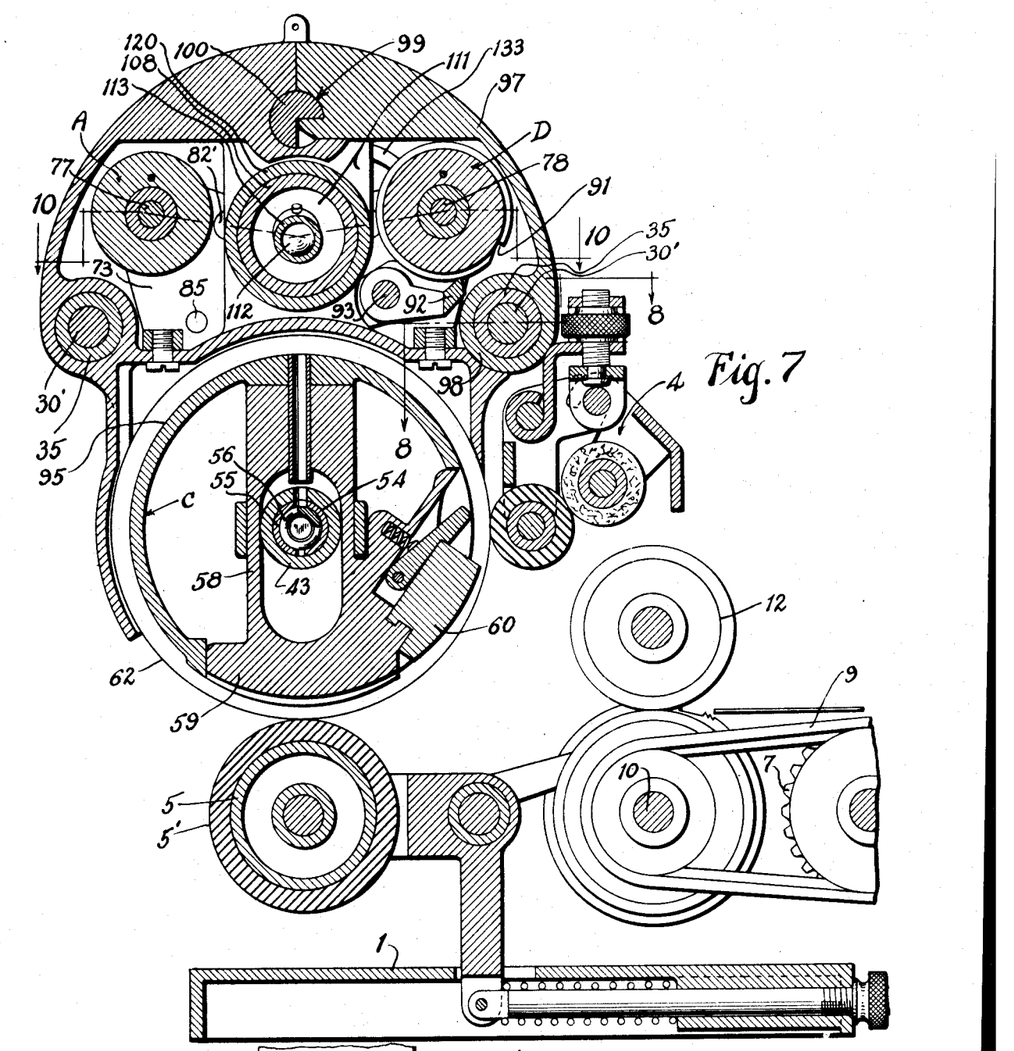
Fig. 7 is a transverse section on line 7—7 of Fig. 2 showing the printing and inking means, the registering mechanism, and means for locking the descending register against further operation when the prepaid impressions are exhausted.

The cylinder C carries a diametrically slidable printing member 58 which encompasses the sleeve 43 and has an arcuate printing die on its outer face provided with suitable engraved indicia representing authorized postal impressions. An auxiliary printing die 60 having indicia representing the name of a post office of origin and the date of mailing may be detachably or stationarily held by suitable means on the member 58 adjacent the printing die 59, as shown in Fig. 7. The member 58 is also provided with a series of gear teeth 61 forming a rack for engagement with the sector 50, as shown in Fig. 2, so that when and as the sleeve 43 is moved forwardly by the cam 18 and yoke 22 the member 58 will be moved outwardly so that the peripheries of the printing dies 59 and 60 will register with the printing circle; i. e. to say the periphery 62 of cylinder C.

It will be noted that cylinder C has a pair of concentric ribs 63, 63 on its inner and outer sides which continuously engage the frictional surface 5' of the impression roller 5 so as to firmly grip the mail matter between the cylinder C and roller 5 in a printing operation.

The sleeve 43 is provided on its outer end with an intermittent driving gear 64 having a disc-like rear portion 65 with a single notch 66 formed therein and a reduced portion 67 with a pair of gear teeth 68, 68 formed on opposite sides of the notch 66. The gear 64 meshes with and drives an idler pinion 69 which has alternately arranged long teeth 70 and short teeth 70' carried on a pin 71 which is held at its opposite ends in a bearing 72 on the meter cover and on a portion of a bracket 73 enclosed in the meter housing. The gear 64 is so arranged that when a sleeve 43 and printing member 58 are retracted the portion 65 of the gear will engage only the long teeth 70 in the pinion 69, as shown in Fig. 3, thus preventing the rotation of said pinion, but when said sleeve is extended forwardly simultaneously with the extension of the printing member 58, the teeth 68 of the portion 64 of said gear will engage the short teeth 70' of the pinion and effect its rotation to the extent of one-fourth of a revolution when the pinion is provided with eight teeth, or to a correspondingly greater or lesser extent, depending upon the number of teeth provided on the pinion.

The short teeth 70' of the pinion continuously engage a larger gear 74 which is fixed to a shaft 75 journaled in the bearing 76 on the meter cover and also in a portion of the bracket 73.

Figure 10:
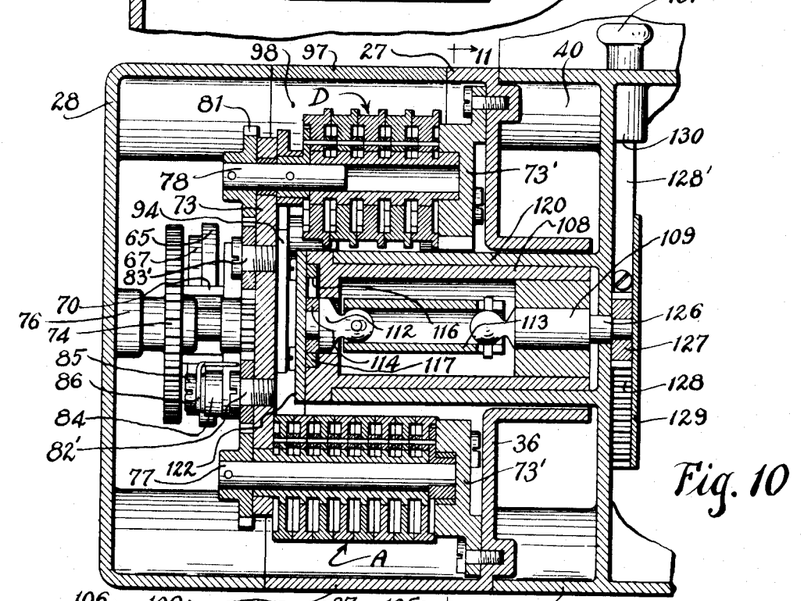
Fig. 10 is a sectional plan of the meter showing the registering mechanism and locking means.
Figure 11:
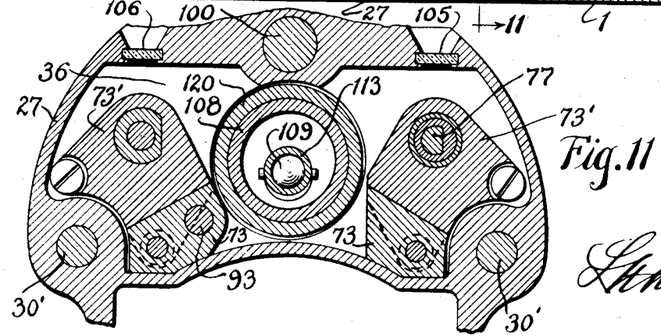
Fig. 11 is a transverse section of the meter on line 11—11 of Fig. 10, also showing details of the registering mechanism.

The register units A and D each embody a plurality of numbering wheels provided with numbers on the faces thereof from "0" to "9" in regular order, and as in other registering units are provided with suitable means for transferring the count from the disc or wheel of lower order to the disc or wheel of next higher order. Said numbering units are rotatably mounted on shafts 77 and 78 respectively, which are held in opposite spaced portions of bracket 73, as shown in Fig. 10.

Figure 3:
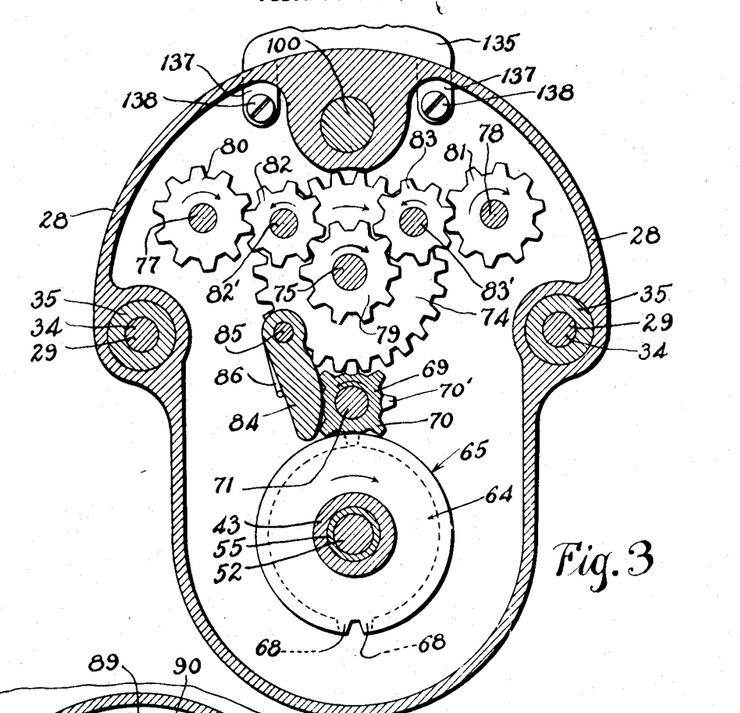
Fig. 3 is a section of the meter on line 3—3 of Fig. 2 showing the means for operatively connecting the printing means with the numbering means or registers.

Means is provided, as shown in Fig. 3, for transmitting corresponding motion to the units A and D at each operation of the printing means and includes a pinion 79 fixed to shaft 75 with pinions 80 and 81 of corresponding size fixed to the shafts 77 and 78 respectively. The idlers 82 and 83 are mounted on shafts 82' and 83' respectively in the bracket 73 and transmit motion from the gear 79 to gears 80 and 81 respectively.

The number of teeth of the several gears in the gear train is determined by the value of the postage to be printed or by the extent of movement of the registers 7 and 8 of each operation to register the successive impressions made by the printing dies. For instance, as shown in Fig. 3, the pinion 69 is provided with eight teeth, and at each printing operation said pinion will move a fraction of a revolution corresponding to two teeth or one-fourth of a revolution. The gear 74 is provided with twenty teeth so that at each operation said gear will be moved one-tenth of a revolution. The gears 79, 80 and 81 are each provided with ten teeth and will be moved one-tenth of a revolution at each operation, thereby registering one at each operation of the printing dies on the ascending register A and on the descending register D.

For accuracy in operation and as an assurance against an over or under movement of the pinion 69, I may provide a pawl 84 pivotally held on a pin 85 against the tension of spring 86 for engagement with the pinion 69 so as to accurately center the teeth of said pinion with the intermittent driving gear 64, altho this is not material to my invention.

Figure 4:
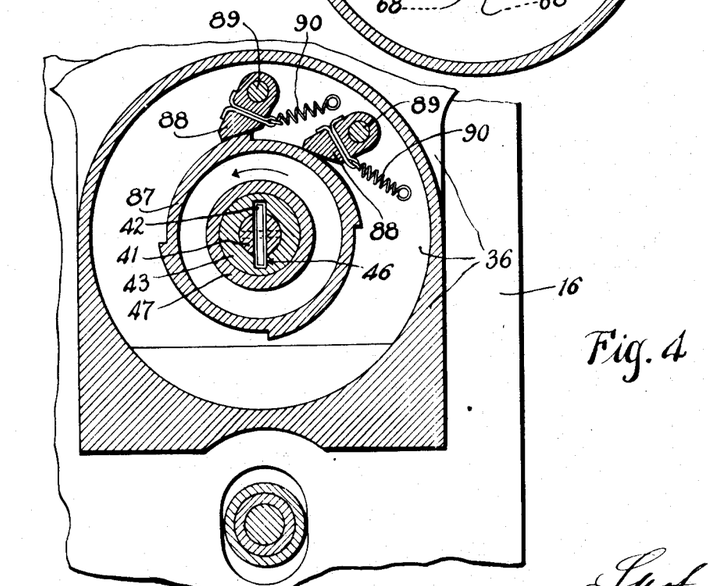
Fig. 4 is a fragmentary section on line 4—4 of Fig. 2 showing means for operatively connecting the printing means with the operating means, and additionally showing means for preventing the reverse rotation of the printing means.

On the rear side of printing cylinder C I provide a ratchet 87 having a plurality of teeth adapted to be engaged by one or a pair of detents 88 mounted on the inner side of the rear wall 36 of the meter housing on pins, as at 89, and yieldably held in engagement with the ratchet 87 by means of springs, as at 90. These details are shown in Fig. 4, and it will be observed that the rotation of the printing cylinder C is permitted in a given direction but is prevented in a reverse direction, except to a slight extent. The purpose of this mechanism is to provide against the exposure of the printing dies when the meter is detached from the machine, as will more clearly appear hereinafter.

The descending register D is provided on the periphery of each of its digit wheels with notches 91 adapted to be engaged by a locking yoke 92 which is pivotally held on a shaft 93 carried on bracket 73. The forward end of shaft 93 carries a latch bar 94 which is adapted to clear the circuit wall 95 of printing cylinder C when the meter is operative, but when the yoke 92 drops into the notches 91 of the digit wheels of the descending unit the depending inner end of the latch 94 will drop into opening 96 in the printing cylinder and prevent the further forward rotation of the cylinder.

This last mentioned condition occurs when the descending register reads "0" on all of its digit wheels and the printing cylinder C will be locked in such a position that the printing dies 59 and 60 will be uppermost within the housing and completely obscured from view, thereby insuring against the making of impressions from the dies.

The meter housing member 27 is cut away on the side at which the unit D is locked so as to provide a space wherein to mount a door 97. Said door has an enlarged hub 98 which is bored to receive one of the bosses 35 on member 27 and the upper portion thereof is provided with a notch 99 adapted to be engaged by a locking member 100 rotatably carried in the meter housing and attached to a cylinder 101 of a lock 102, which is provided at the top and in the center of the meter housing. This lock has a stationary escutcheon 103 and a movable escutcheon 104, the latter of which is arranged to cover the key slot in the cylinder 101 and may be secured to the stationary escutcheon 103 by an ordinary lead seal as in other types of meters.

It will be apparent that the rotation of the lock cylinder 101 in a counter clockwise direction, as seen in Fig. 7, will disengage the lock 100 from the notch 99 of the door, thereby permitting the door to swing open on the axis of its hub 98 for affording access to the descending register unit D. Glass covered windows 105 and 106 are provided in the member 27 and in the door 97 of the meter housing thru which the register A and D may be readily read.

The meter 2 being removable from the machine for the purpose of substituting a meter of one denomination for one of another denomination, and for transporting the meter to a post office for resetting, it is necessary that means be provided for locking the meter in operative position on the machine against accidental displacement. Moreover, it is necessary when the meter is detached from the machine to lock the printing cylinder C in such position that the printing dies 59 and 60 will be completely obscured and inaccessible so as to prevent tampering with the mechanism.

To this end I have provided a lock 107 which is permanently held in the rear end of an elongated cylindrical boss 108 which is formed on the rear wall 36 of the meter housing. (See Fig. 2.) Said lock includes the usual rotatable cylinder 109 held within the barrel 107 and is slotted to receive a key as at 110, whereby the member 109 may be rotated for locking and unlocking the meter. The forward end of the boss 108 is closed by a wall 111 within which is seated a rotatable member 112 which is connected with the member 109 by means of a universal coupling 113 in the arrangement shown. Said coupling may be unnecessary, however, and the member 112 may be direct connected in some cases with the member 109 for rotation when the member 109 is rotated by means of the key.

Externally of the wall 111 I provide a cam 114 which is fixed to a reduced extension 115 on the member 112. Said cam is seated in an aperture 116 formed in a locking member 117 which is slidably disposed in a recess 118 in the wall 111. (See Fig. 6.)

The latch 117 has an extension 119 at its upper end and a somewhat longer extension 119' at its lower end, and a cam 114 is rotatable with the cylinder 109 for alternately rendering the portions 119 and 119' effective for locking the meter on the machine and for locking the printing cylinder C against rotation, respectively.

Figure 6:
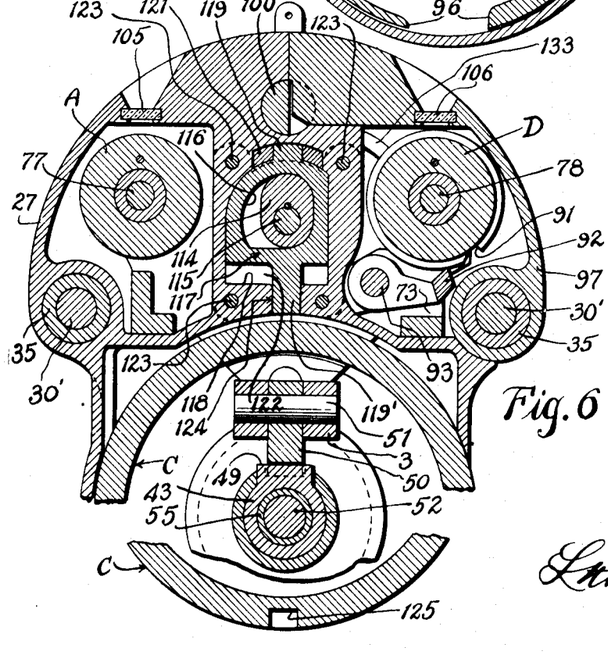
Fig. 6 is a transverse section on line 6—6 of Fig. 2 showing means for locking the meter in operative position and against accidental removal.

The portion 16' of the main housing wall has a forwardly extending cylindrical boss 120 which telescopes the boss 108 of the meter when the meter is positioned on the machine. The upper portion of the boss 120 has an arcuately formed projection 121 with an aperture therein adapted to receive the portion 119 of latch 117, as shown in Fig. 6. The latch 117 and its recess 118 are covered by a plate 122 which is fitted over the boss 108 and is secured thereto by means of screws or rivets, as at 123. (See Fig. 6.) Thus, as the lock 109 is rotated the latch 117 is moved upwardly or downwardly, as the case may be, in its recess 118.

The portion 119' of said latch extends thru an aperture 124 in the register housing, as shown in Fig. 6, so that for the purpose of locking cylinder C against rotation said portion 119' may engage a recess 125 on the periphery of the printing cylinder C for locking said cylinder against rotation. The lock member 109 is operated by means of the key 110 which is integral with or attached to a spindle 126 which is rotatable in the wall 16' of the main housing and carries on its rear end a gear 127 which meshes with and is operated by a rack 128. Said rack and gear are supported on and enclosed by a bracket 129 attached to the wall 16'. (See Figs. 2 and 9.)

Figure 9:
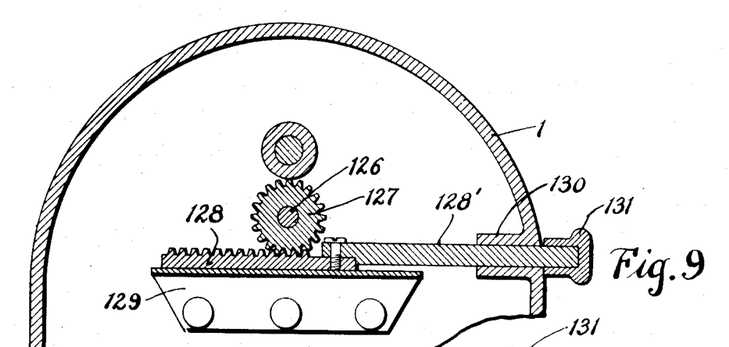
Fig. 9 is a transverse section on line 9—9 of Fig. 2 showing means for locking and unlocking the meter for attachment to and detachment from the machine.

The rack is provided with a stem 128' which is slidable in a boss 130 of the main housing 1 and carries an operating button 131 thereon externally of the housing. When the meter is positioned in the machine the normal positions of the rack 128, gear 126, and operating stem 128' are as shown in Fig. 9, with the button 131 in its innermost position. In such case the latch 117 will be in its uppermost position with the portion 119 thereof locked in the portion 121 of the boss 120, thus preventing the outward movement of the meter from the housing. Also the portion 119' of said latch will be disengaged from the recess 125 of the printing cylinder, thus permitting the free rotation of said cylinder.

When the rack is extended outwardly the position of the latch will be such that the portion 119 thereof would disengage the member 120 while the portion 119' will engage the recess 125 of the printing cylinder, thus locking the printing cylinder against rotation but permitting the removal of the meter from the machine.

Figure 5:
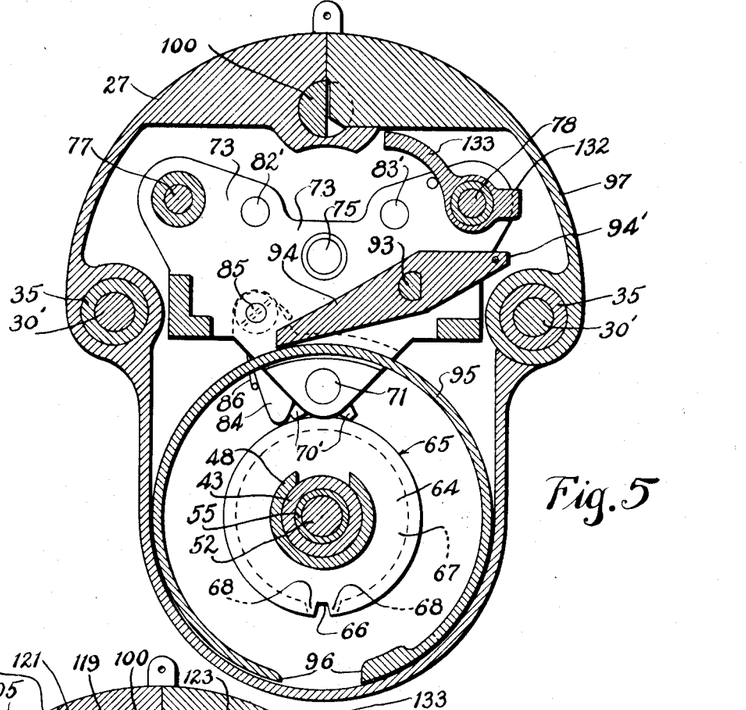
Fig. 5 is a transverse section on line 5—5 of Fig. 2 showing means controlled by the registering mechanism which is operative for locking the printing means against rotation when the prepaid impressions have been exhausted.

Referring to Fig. 5 it will be noted that I provide a cam 132 coaxially mounted with the shaft 78 of the descending register unit D and externally of the frame 73 which supports the register units. Same cam has an operating handle 133 which when moved in a clockwise direction, as seen in Fig. 5, will lower the cam 132 into engagement with the heel 94' of the locking member 94 so as to raise said lock out of engagement with the opening 96 in the printing cylinder and at the same time move the locking yoke 92 out of engagement with the digit wheels of the register.

The cam 132 thus facilitates the unlocking and resetting of the meter by authorized parties when a predetermined number of impressions have been made by the printing cylinder and the device is locked against further operation.

A suitable handle 134 is provided at the top of the meter 2 which is supported on bars 135 and 136 at its ends. The bar 135 has extensions 137, 137 extending thru apertures in the upper wall of the meter housing cover and attached to the wall 38 by means of screws 138, 138. The handle bar 136 similarly is secured to the member 27 of the meter housing and is attached to the rear wall 36 thereof by screws 139, 139 and is provided with a rear extension 140 with a slot 141 therein adapted to engage the body 142 of a set screw 143, which carries a nut 144 internally of the housing 1, whereby the portion 140 of the handle may be clamped between the wall of the housing and said nut as an additional safeguard against accidental detachment of the meter during the operation of the machine.

As shown in Figs. 2 and 4, the rear wall 36 of the meter extends downwardly to a point substantially flush with the periphery of the printing cylinder C, while the depending portion of the meter cover 28 is circular, as shown in Fig. 3. Therefore, in order that the meter may be supported in an upright position during a setting operation or at other times, I provide a rest 145 pivotally supported in the meter cover 28 and extending thru a slot 146 which is pivoted at 147 on the cover. The member 145 projects from the meter cover and may be turned downwardly against the tension of spring 148 so that the normally uppermost surface 149 of the rest will engage the supporting surface, and together with the lower edge of wall 36 will serve to support the meter in an upright position.

In operation, the meter is detached from the machine by loosening said screw 143 and operating the key 110 by means of member 131. Thereupon the meter may be moved outwardly to the left, as seen in Fig. 2, so as to disengage the boss 120 and pins 30', 30' projecting from the machine housing 1. Before the lock 109 can be operated, however, it is necessary to turn the printing cylinder C into such a position that the recess 125 therein will register with and receive the portion 119' of latch 117. Otherwise said latch may not be moved downwardly from engagement with the portion 121. The meter being detached may be transported to a post office for setting or resetting by authorized officials.

In a setting operation the digit wheels of the descending unit D are moved so that the proper number of impressions will appear thru the window 106 in the meter housing door. Thereafter the door is closed and the lock 102 is operated for locking the register against unauthorized access, and as an additional precaution the movable escutcheon 104 is sealed to the stationary escutcheon 103 by means of the usual lead seal and wire so as to protect the key slot of the lock 101 against unauthorized access.

The meter may be then replaced in a machine by sliding the same longitudinally of the axis of the printing cylinder C onto the boss 120 and pins 30', 30'. As the meter is thus positioned the key 42 in the operating shaft 41 will engage the slot 46 in the printing cylinder sleeve 43, thus rendering the printing cylinder again operatively connected with the machine. When a meter is moved into final position the lock 109 is again operated by pushing member 131 inwardly, thus unlocking the latch 117 from the printing cylinder and locking the meter firmly in position on the machine housing, whereupon the set screw 143 may be again tightened as an additional precaution against displacement of the meter.

Referring to my pending application hereinabove described, it will be understood that with a meter of this character the operating mechanism is provided with means for extending the dies 59 and 60 only when a piece of matter is advanced by the feeding means to printing position. Therefore the impression member 5 will continuously engage the periphery of the portions 63, 63 of the printing cylinder. Moreover, no impressions will be recorded by either the ascending or descending register units unless the printing dies are extended to operating position.

What I claim is:

1. A postage meter comprising a housing, a meter detachably supported on said housing and including a rotatable printing cylinder, means for registering successive impressions made by the printing cylinder, means for operatively connecting said printing cylinder and said registering means with the operating means on the housing, and common means enclosed by said meter and operable only when the meter is operatively positioned on the machine for locking said meter against displacement and for unlocking said printing cylinder for operation.

2. A postage meter comprising a mail feeding and forwarding mechanism, a housing therefor, and a meter unit detachably associated with said mechanism and including printing and registering means, and a locking device operable only when the meter is positioned on said housing for simultaneously locking the meter against displacement and for unlocking the printing means for operation.

3. A postage meter comprising a mail feeding and forwarding mechanism, a housing therefor, and a meter unit detachably associated with said mechanism and including printing and registering means, and a locking device operable only when the meter is positioned on said housing for simultaneously locking the meter against displacement and for unlocking the printing means for operation, said locking means being operative for simultaneously unlocking the meter preparatory to its removal from the machine and for locking said printing cylinder against operation.

4. A postage meter comprising mail feeding and forwarding mechanism, a housing therefor, a meter unit detachably supported on said housing and including printing and registering means, and a locking device operable for unlocking the meter from the machine only when the printing means is inoperatively and inaccessibly positioned in the meter.

5. A postage meter comprising mail feeding and forwarding mechanism, a housing therefor, a meter unit detachably supported on said housing and including printing and registering means, and a locking device operable for unlocking the meter from the machine only when the printing means is inoperatively and inaccessibly positioned in the meter, said locking means including devices for locking the printing means against operation prior to the removal of the meter from the machine.

6. A postage meter comprising mail feeding and forwarding means, a housing therefor, a meter unit detachably supported on said housing, means for locking said meter in operative connection with the feeding and forwarding mechanism, and means controlled by the locking and unlocking of the meter for unlocking and locking the printing means respectively, for the purpose described.

7. A postage meter comprising mail feeding and forwarding means, means controlled by the movement of mail matter to printing position for actuating a printing means, a meter unit detachably supported relative to said other means and including printing and registering means, means for locking said meter in operative position, and means controlled by the locking and unlocking of said meter for unlocking and locking said printing means respectively, said locking means being effective for locking and unlocking the printing means only when the meter is operatively positioned in the machine.

8. A postage meter comprising mail feeding and forwarding means, a housing therefor, means for actuating a printing means on said housing, a meter detachably supported on said housing and including printing and registering means operatively connected with said actuating means, means for locking said meter in operative position, and means controlled by the locking and unlocking of said meter for unlocking and locking said printing means respectively for operation.

9. A postage meter comprising a housing, mail feeding and forwarding means thereon, a meter unit detachably supported on said housing and including a continuously rotatable printing cylinder with extensible printing dies thereon and registering means, means on said housing for rotating said printing member and for moving said dies to and from printing position, and means for operatively connecting said printing member with said registering means whereby the registering means will be operated each time said dies are extended to printing position.

10. A postage meter as characterized in claim 9, including means for locking said meter in operative position, and means controlled by the locking and unlocking of said meter for unlocking and locking said printing member respectively only when the meter is operatively positioned on the housing.

11. A postage meter comprising a housing, an operating member thereon, a meter detachably supported on said housing and including a printing member, means for locking said meter in operative position, and means controlled by the locking and unlocking of said meter for unlocking and locking said printing member respectively only while the meter is operatively positioned in said housing.

12. A postage meter as characterized in claim 11, including a registering means in said meter operatively connected with and adapted to be operated at each printing operation made by the printing member.

13. A postage meter as characterized in claim 11, including a registering means in said meter operatively connected with and adapted to be operated at each printing operation made by the printing member, and means for locking said printing member against further operation when a predetermined number of impressions have been made thereby.

14. A postage meter as characterized in claim 11, including a registering means in said meter operatively connected with and adapted to be operated at each printing operation made by the printing member, and means for automatically locking said registering means against further operation when a predetermined number of impressions have been made by the printing member.

15. A postage meter as characterized in claim 11, including a registering means in said meter operatively connected with and adapted to be operated at each printing operation made by the printing member, and means for automatically locking said printing member and said registering means against further operation when a predetermined number of impressions have been made by the printing member.

16. A postage meter comprising a housing locked against unauthorized access, a printing cylinder rotatably mounted therein, means for detachably connecting said printing cylinder with an operating means, a registering means enclosed by said meter, normally inoperative means for connecting said printing cylinder with said registering means, a printing die extensibly mounted on said printing cylinder and normally retracted from printing position during the rotation of said cylinder, and means for rendering said registering means operative when said dies are extended to printing position.

LUTHER L. MACK.